Figure 1:
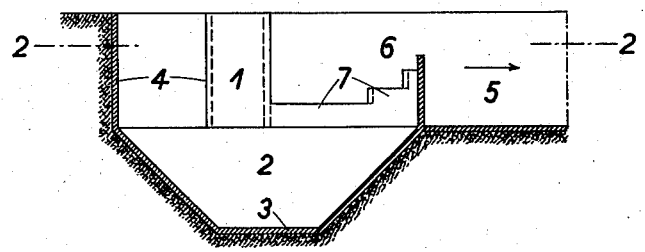

July 27, 1937.  H. GEIGER  2,088,294

SAND TRAP

Filed Sept. 2, 1936

INVENTOR:

Patented July 27, 1937

2,088,294

UNITED STATES PATENT OFFICE 2,088,294

SAND TRAP

Hellmut Geiger, Karlsruhe, Baden, Germany

Application September 2, 1936, Serial No. 99,125
In Germany June 11, 1934

2 Claims. (Cl. 210—57)

My invention relates to sand-traps for plants for purifying refuse or waste water. The object of such devices is to separate the mineral substances from the water, while the lighter organic substances have to be carried away further. Known devices, in which the waste water is caused to flow at reduced speed through a chamber having a deepened bottom, have the fault, that in spite of many provisions made large sediments arise if the supply is slow, while mineral substances are carried along into the outlet if the supply is violent, because the settling speeds of the heaviest and the lightest mineral substances to be separated out are contiguous to each other and the organic substances adhere firmly to the sand by reason of their soft and sticky nature.

If water muddied by sedimentary matters is caused to flow at a certain speed through a curvature, these matters will be deposited on the inside of the curvature, because an additional flow transversal to the axis of the conduit arises. This fact known in itself is utilized by my invention in the following manner: The sabulous waste water is supplied tangentially to the cylindrical upper part of the trap through an open conduit, flows substantially along the wall of this part and after having passed an arc as long as possible is discharged in purified condition over a lip formed by a cut-off in the wall into an outlet conduit, while the sand will settle in the conical lower part of the trap.

The trap according to my invention is designed for separating also if the quantities of water supplied are variable. At the same time an important new effect is obtained in as much as by a circular bottom flow the settled matter is moved slowly in a circle, whereby the organic substances still adhering to the sand are washed out so that a pure sand is gained even without using a special stirring device. Furthermore, the compact form of the settling space makes possible eventually an additional whirling by central injection of compressed air at the bottom at low costs of service. Furthermore, by correspondingly shapening the supply conduit it is possible to maintain in the trap an approximately constant circumferential speed, so that the organic substances cannot settle. And yet the danger of washing out the settled sand is small even if the supply is violent, since thereby the effect of depositing the sand and moving it to the trap centre is still increased. Furthermore, smaller times of stay than in the usual long-extended sand-traps are necessary, and the stay- and settling-space distinguishes by an unexcelled compact form. At the same time this form makes possible a simple mechanical removal of the sediment which can take place during the service by grippers or the like without running the risk of losses of sand. Therefore the use of several chambers and of a larger sand staple-room can be renounced. All these circumstances result not only in an improved effect but also in the saving of costs of building and service.

Figure 2:
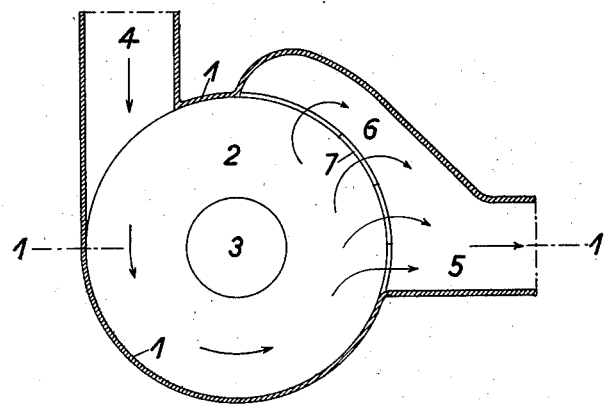

A preferred form of the sand-trap according to my invention is illustrated in the accompanying drawing in which Figure 1 is a vertical section through the trap on the line 1—1 of Figure 2, and Figure 2 is a horizontal section on the line 2—2 of Figure 1.

The trap is formed by a tank made in concrete or other suitable material. This tank is open at the top and has a cylindrical upper part 1 and a conical lower part 2 with a small horizontal bottom 3. An inlet conduit 4 also open at the top enters tangentially into the part 1, while an outlet conduit 5 leaves this part radially and rectangularly to the inlet conduit 4. The mouth of the outlet conduit 5 has an enlargement 6 surrounding the wall of the part 1 at a certain distance therefrom and extending over an arc of about 90°, and the wall of the part 1 has a cut-off extending over the same arc and forming an overflow-lip 7.

The waste water is supplied by the conduit 4 to the part 1 and flows through this part in an arc of circle of about 180°. The sand carried by the water settles in the part 2, while the purified water flows over the lip 7 into the enlargement 6 and the conduit 5 and flows away through the latter. In order to obtain a uniform low outflow speed of the water, the lip 7 is in the form of a stair descending in the direction towards the conduit 4; or instead its upper edge may be inclined in this direction. The sand settled in the part 2 is moved therein continually towards the centre, as the water contents continually circulates slowly in the trap. The removal of the sediment from the trap is effected preferably by a rotary crane and a gripper discharging into a tilting truck, in which the material is carried away.

What I claim as my invention and desire to secure by Letters Patent is:

1. A sand-trap comprising in combination a tank open at top and closed at bottom and having an upper cylindrical boundary wall and a lower conical boundary wall but no interior structures, a conduit open at top for supplying the sand containing water to said tank, said conduit entering into said tank through said upper boundary wall and tangentially therewith, and a second conduit open at top for carrying away the purified water, said second conduit leaving said tank through said upper boundary wall and at an angular distance from the mouth of the first said conduit, and said upper boundary wall having a cut-off forming an overflow-lip opposite to the mouth of said second conduit.

2. A sand-trap comprising in combination a tank open at top and closed at bottom and having an upper cylindrical boundary wall and a lower conical boundary wall but no interior structures, a conduit open at top for supplying the sand containing water to said tank, said conduit entering into said tank through said upper boundary wall and tangentially therewith, and a second conduit open at top for carrying away the purified water, said second conduit leaving said tank through said upper boundary wall and at an angular distance from the mouth of the first said conduit, the mouth of said second conduit having an enlargement surrounding said upper boundary wall at a certain distance therefrom and extending over a certain arc thereof, and said upper boundary wall having a cut-off forming an overflow-lip opposite to the mouth of said second conduit and said enlargement, said lip decreasing in height in the direction towards the mouth of the first said conduit.

HELLMUT GEIGER.